United States Patent [19]

Hart

[11] 3,950,045

[45] Apr. 13, 1976

[54] JET AND SPRAY PRODUCING APPARATUS
[76] Inventor: Bernard Eaton Hart, Rosebank, Stoford, Nr. Salisbury Wiltshire, England
[22] Filed: Apr. 11, 1975
[21] Appl. No.: 567,297

[30] Foreign Application Priority Data
Apr. 11, 1974 United Kingdom............... 16356/74

[52] U.S. Cl............................... 308/36 R; 308/161
[51] Int. Cl.² F16C 17/00; F16C 19/00; F16C 21/00; F16C 29/00
[58] Field of Search............. 308/36, 139, 161, 76; 239/251, 264, 256, 258, 252

[56] References Cited
UNITED STATES PATENTS

| | | | |
|---|---|---|---|
| 1,198,919 | 9/1916 | Holt..................... | 308/161 |
| 1,677,486 | 7/1928 | Nelson................. | 239/251 |
| 2,453,182 | 11/1948 | Bechler................ | 308/161 |
| 2,534,016 | 12/1950 | Grelson................ | 239/258 |
| 2,693,397 | 11/1954 | Baker................... | 308/161 |
| 3,642,207 | 2/1972 | Krogman.............. | 239/251 |

Primary Examiner—Lloyd L. King
Attorney, Agent, or Firm—Brisebois & Kruger

[57] ABSTRACT

A rotatable bearing assembly comprises a relatively fixed part and a rotatable part having a bore in which the first part extends and about the axis of which the parts are rotatable, the fixed part comprises two bodies, which are relatively axially movable and each providing one of a pair of opposed radially extending bearing surfaces co-operating with corresponding radially extending bearing surfaces on the second part, each part has a passage for fluid therethrough which passages are in communication and the bodies of the first part are relatively axially biassed in a direction to reduce the gap between the opposed bearing surfaces by the pressure of fluid in the passages. The bearing assembly is particularly designed for use in a jet or spray producing apparatus, the first part being connected to a supply of fluid under pressure and the second part to an arm carrying a nozzle, the axis of the nozzle being inclined to the plane of rotation of the arm so that fluid rising therefrom will exert a force on the arm tending to rotate it. Such an apparatus may include a speed governer whereby the inclination of the nozzle is automatically adjusted in dependence on the angular speed of the arms to maintain the angular speed constant.

6 Claims, 6 Drawing Figures

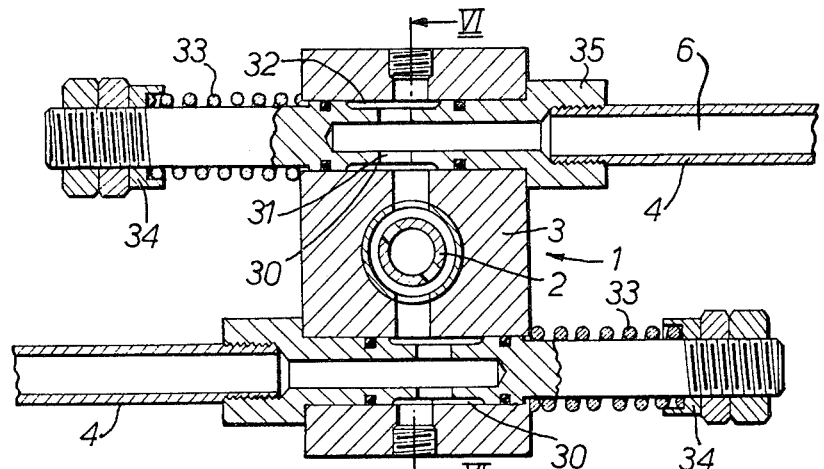
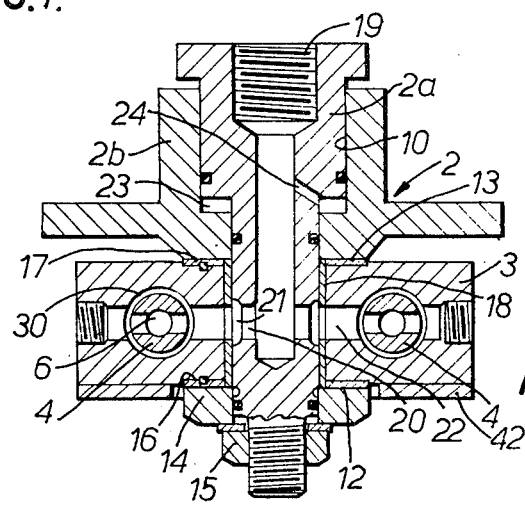
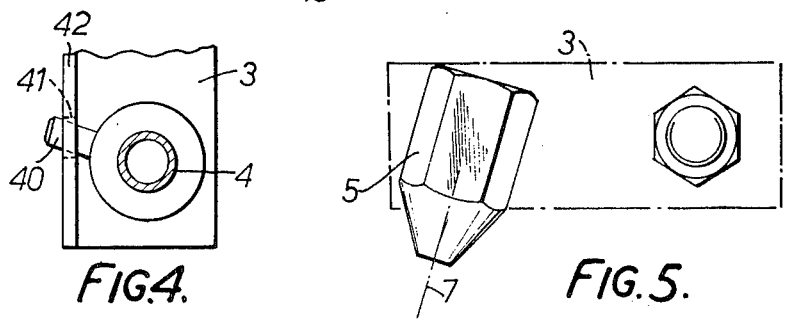

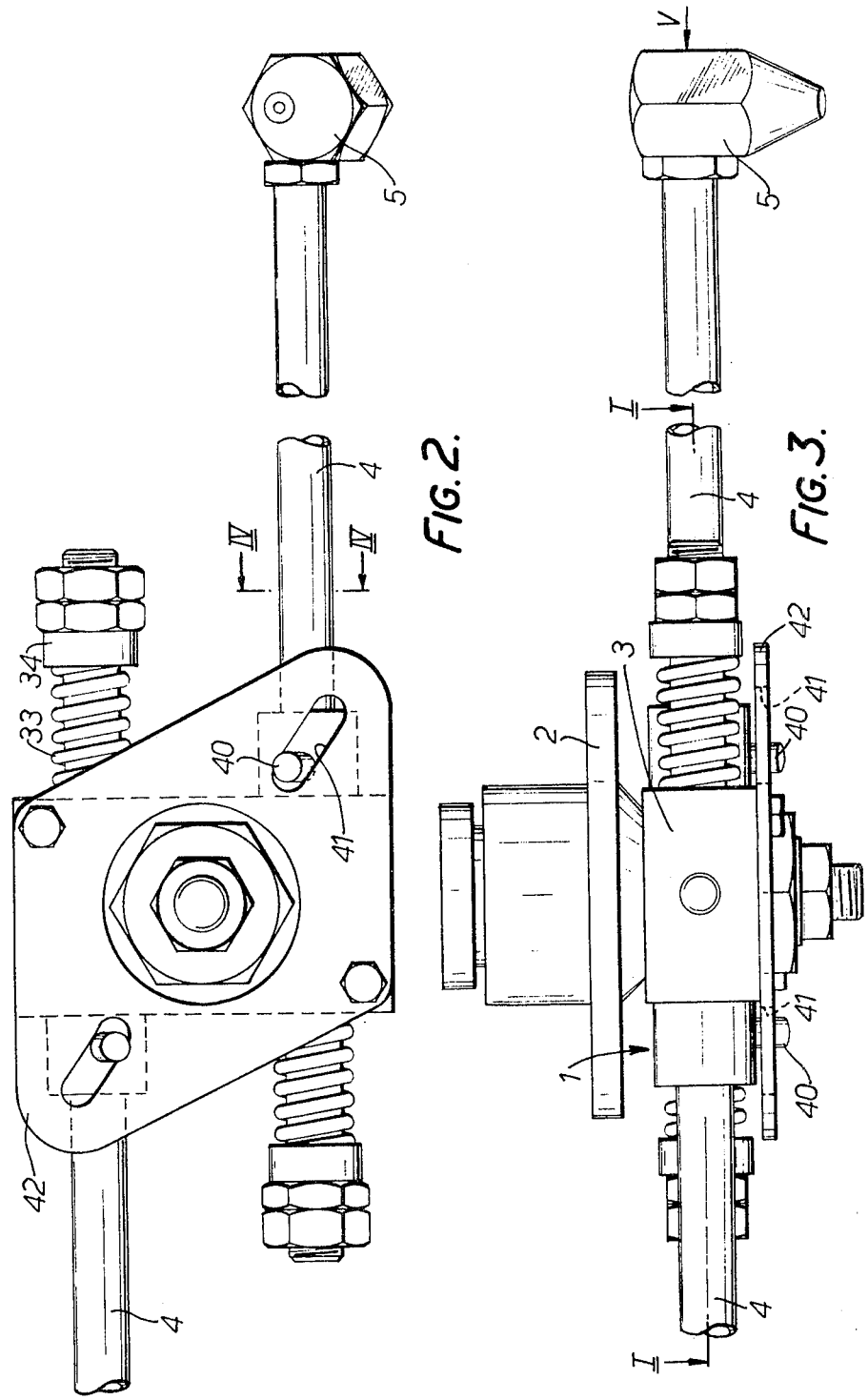

JET AND SPRAY PRODUCING APPARATUS

The present invention is concerned with improvements in and relating to self-propelled rotating jet or spray producing apparatus and particularly but not exclusively to such apparatus for use with high pressure fluid supplies, for example at pressures of the order of 3,000 p.s.i..

The use of high pressure fluid supplies introduces two main problems into apparatus of this type. One is that the rotary bearing surfaces between the stationary part through which the fluid is introduced and the rotating part carrying the jet or spray head cannot stand up to the resulting high rotational speeds and the other is that the apparatus tends to accelerate uncontrollably.

According to one aspect of the present invention there is provided a rotatable bearing assembly comprising a first part and a second part, which parts are relatively rotatable about an axis, wherein the first part extends in an axial bore in the second part and has a passage for fluid under pressure communicating with a passage in the second part, the first part providing opposed annular radially extending bearing surfaces cooperating with corresponding bearing surfaces on the second part, the first part comprising first and second relatively axially movable bodies each providing one of the opposed bearing surfaces and arranged so as to be relatively axially biassed by the pressure of fluid in the passages in a direction to reduce the axial gap between the opposed bearing surfaces.

In the preferred embodiment a chamber is formed between the first and second bodies and is placed in communication with the passage in the first body so that the pressure of fluid in the chamber will provide the said bias.

According to another aspect of the present invention there is provided apparatus for producing a rotating jet or spray of fluid comprising an arm having a nozzle means at one end communicating with a fluid inlet passage means in a first part on which the arm is mounted for rotation about an axis transverse to the longitudinal axis of the arm, the nozzle means being arranged with its axis inclined to the plane of rotation of the arm such that fluid leaving the nozzle means will exert a force on the arm tending to rotate it about the axis of rotation, wherein the apparatus includes means for automatically varying the angle of inclination of the axis of the nozzle means to the plane of rotation of the arm for automatically controlling the speed of rotation of the arm.

In the preferred embodiment the arm is mounted on a second part, which rotates therewith, for rotation about its longitudinal axis, and the control means includes means for rotating the arm about its longitudinal axis to vary the inclination of the axis of the nozzle means. The arm may be longitudinally slidable in the second part and the control means may include cooperating means on the arm and the second part for causing the arm to rotate about its longitudinal axis as it slides through the second part, means such as a biassing spring being provided to prevent the arm from sliding before a predetermined centrifugal force, and therefore a predetermined angular speed, is attained.

Further features and advantages of the present invention will become apparent from the following description of an embodiment thereof, given by way of example only, with reference to the accompanying drawings, in which:

FIG. 1 is a horizontal section through an embodiment of apparatus in accordance with the present invention, taken on the line I—I of FIG. 3;

FIG. 2 is a plan view of the apparatus of FIG. 1;

FIG. 3 is a side view of the apparatus of FIG. 1;

FIG. 4 is a section on the line IV—IV of FIG. 2;

FIG. 5 is a view in the direction of arrow V in FIG. 3; and

FIG. 6 is a section on the line VI—VI of FIG. 1.

As shown in the drawings, the apparatus comprises a central bearing assembly 1, comprising a stationary part 2 to which a fluid supply conduit (not shown) is connected and a rotary part 3. The rotary part 3 carries at least one arm 4 having a nozzle 5, for producing a jet or spray of fluid, at its free end. As shown, two arms spaced by 180° are provided. It will be appreciated that more than two arms may be provided, the arms being equally angularly spaced about the axis of rotation. Alternatively, a single arm may be provided together with a counterweight means to balance the system.

Each arm 4 is formed with a longitudinal passage 6 providing fluid communication between the nozzle 5 and the fluid inlet in the stationary bearing assembly part 2.

Each nozzle 5 is arranged with its axis 7 extending perpendicular to the longitudinal axis of the arm, inclined to the axis of rotation of the apparatus and inclined by an angle A to the plane of rotation of the arms, so that the force exerted on each arm 4 by fluid exiting from the nozzle 5 causes the arm to rotate, the speed of rotation depending on the fluid pressure and the angle of inclination A of the nozzle axis.

The stationary part of the bearing assembly comprises a first body 2a which extends through bores 10, 11 formed respectively in a second body 2b of the stationary part and a third body 3 forming the rotary part of the bearing assembly. The first and second bodies 2a, 2b are prevented from relative rotation by a pin (not shown) in one body engaging in an axial groove in the other body, the axial extent of the groove permitting axial relative movements of the two bodies. Each of the bodies 2a, 2b provides an annular radially extending bearing surface 12, 13 respectively, the bearing surfaces 12, 13 being opposed and that of the first body being provided by a thrust ring 14 held in place by a nut 15. These bearing surfaces cooperate with annular radially extending bearing surfaces 16, 17 on the third body 3 and provided by thrust pads, e.g. of sintered bronze PTFE, pinned to the body 3. A bearing ring 18 is provided in the bore 11 in the third body 3 between the body 3 and the body 2a.

Fluid is supplied to a passage or blind bore 19 in the first body which communicates by radial ports 20 with an annular groove 21 in the periphery of the first body in that region surrounded by the third body 3. The third body is provided with radial passages 22 in communication with the passages 6 in the arms 4 and with the groove 21 so that there is a continuous supply of fluid to the passages 6.

With the arrangements so far described, the pressure of incoming fluid on the end of the blind bore 19 in body 2a tends to increase the gap between bearing surfaces 12, 13 and, with normal manufacturing tolerances and wear on the bearing surfaces, to allow substantial quantities of the fluid to leak out between the thus spaced bearing surfaces 12, 16 and 13, 17. If the nut 14 is tightened to prevent this leakage, with high speed operation extremely high frictional forces develop between the bearing surfaces which in turn cause high wear, leading to the leakages described above, and may indeed cause breakdown of the bearing.

To avoid the above disadvantages, the bore 10 in the second body is stepped, as is the periphery of the first body, to provide an annular chamber 23 between the first and second bodies. The chamber is placed in communication with incoming fluid in bore 19 by a passage 24. Pressure of fluid in the chamber 23 biases the first body 2a relative to the second body 2b in a direction to reduce the gap between the bearing surfaces 12, 13 and therefore between bearing surfaces 12, 16 and 13, 17. The effective area of the chamber 23 is calculated such that the biassing force is sufficient to permit only a small leakage, e.g. of the order of less than 10%, of fluid between the bearing surfaces, which leakage is sufficient to lubricate the surfaces but not to substantially reduce the pressure of fluid flowing to the nozzles.

In this way the bearing surfaces are lubricated to reduce friction therebetween and wear is consequently reduced and automatically compensated for. Additionally, the bearing assembly does not need to be manufactured to small tolerances since such tolerances are automatically compensated for.

The arms 4 are received in transverse bores 30 in the third member 3, which bores communicate with the radial passages 22 and are provided with radial ports 31 and peripheral grooves 32 in this region to permit fluid to be continuously supplied to passages 6 and nozzles 5.

To avoid the problem of uncontrolled speed and acceleration of the apparatus in use, a governor or speed control is incorporated in it. To this end each arm is slidable in the direction of its longitudinal axis in bore 30 in the third member 3 and is rotatable about its longitudinal axis. Each arm is biassed in a direction opposite to the line of action of centrifugal forces, which in use will be exerted on the arm, by a spring 33 acting between a surface of the body 3 and a member 34 fixed to the end of the arm 4 remote from the nozzle 5. To limit movement of the arm in the direction of bias, it is provided with a flange 35 providing an abutment surface which contacts the body 3. Additionally a control means is provided coupling body 3 to each arm 4, which causes rotation of each arm 4 in a direction to increase the angle of inclination A of the axis of the nozzle as the arm moves through the bore 30 against the biassing force and under centrifugal force.

As shown, this control means takes the form of a projection 40 on each arm 4 which is engaged in a slot 41 inclined to the longitudinal axis of the arm in a plate 42 mounted on the body 3. Alternatively, the control means could take the form of a pin on the plate engaged in a spiral groove in a respective arm.

To start operation of the above-described apparatus, the arms are rotated about their longitudinal axes to a position of minimum angle of inclination A of the nozzle axes and fluid is supplied to the inlet in the bearing assembly 1. The arms start to rotate and, because of the minimum angle A of the nozzle axes, maximum force is exerted on the arms 4 to overcome the initial high static friction between the bearing surfaces 12, 16 and 13, 17. Once this static friction has been overcome, the arms 4 accelerate until the required angular speed is attained. At this point the centrifugal forces on the arms 4 overcome the bias of the springs 33 and the arms slide in the third body 3 causing rotation of the arms about their longitudinal axes to increase the angle A of the axes of the nozzles 5. Consequently the tangential component of the force exerted on the arms is reduced as is the acceleration. A steady state is eventually reached with the arms rotating at constant speed.

To vary this steady state speed, it is only necessary to change the biassing force of the springs 33.

What is claimed is:

1. A rotatable bearing assembly comprising:
    a first part;
    a second part;
        means defining a bore in said second part through which said first part extends, said parts being relatively rotatable about the axis of said bore;
        means defining a passage for fluid in said first part;
        means defining a passage for fluid in said second part and in communication with said passage in said first part;
        means defining a pair of opposed radially extending annular bearing surfaces on said first part;
        means defining a pair of radially extending annular bearing surfaces on said second part, each said bearing surface on said second part co-operating with one of said bearing surfaces on said first part;
        wherein said first part comprises a first body and a second body, which are relatively axially movable and each provide one of said bearing surfaces of said first part, and means whereby said bodies are axially biassed by the pressure of fluid in said passages in a direction to reduce the axial gap between said bearing surface of said first part.

2. An assembly as claimed in claim 1 wherein said characterised bearing means comprises a chamber formed between said bodies and having opposed radially extending walls defined by said bodies, said chamber being in communication with said passages and arranged such that the pressure of fluid in said chamber will provide said axial bias.

3. An assembly as claimed in claim 2, wherein said passage in said first part is formed in said first body, extends axially thereof, has a closed inner end and communicates radially with said passage in the said second part, the areas of said opposed radially extending walls of said chamber depending on the area of said passage in said first body.

4. An assembly as claimed in claim 3, wherein said passage in said first body communicates with said passage in said second part between said bearing surface of said first part and the areas of said opposed radially extending walls of said chamber are arranged so that there will be a controlled leak of fluid from the junction between said passages and between the pairs of said co-operating bearing surfaces to lubricate said bearing surfaces.

5. An assembly as claimed in claim 4, wherein said first body extends through a bore in said second body and through said bore in said second part, said second body having opposed radially directed surfaces forming one of said opposed bearing surfaces and one of said opposed walls of said chamber.

6. An assembly as claimed in claim 1, wherein said first part is relatively fixed and is adapted to be connected to a supply of pressurised fluid and said second part carries an arm bearing a jet or spray forming means at its outer end, said jet or spray forming means communicating with said passage in said second part.

* * * * *